United States Patent [19]

Terrone

[11] 4,028,573
[45] June 7, 1977

[54] ROTOR FOR AN ELECTRICAL MACHINE

[75] Inventor: Andre Terrone, Romans, France

[73] Assignee: Societe Anonyme des Equipements S.E.I.M., Romans, France

[22] Filed: Apr. 26, 1976

[21] Appl. No.: 680,169

[30] Foreign Application Priority Data

Apr. 29, 1975 France .............................. 75.14050

[52] U.S. Cl. ................................ 310/217; 310/42; 310/263
[51] Int. Cl.² ........................................ H02K 1/06
[58] Field of Search ............ 310/42, 217, 263, 216, 310/218

[56] References Cited

UNITED STATES PATENTS

| | | | |
|---|---|---|---|
| 2,196,682 | 4/1940 | Nowosielski | 310/263 UX |
| 2,512,848 | 6/1950 | Brouwer | 310/42 |
| 3,254,372 | 6/1966 | Hofbauer | 310/217 X |
| 3,973,153 | 8/1976 | Berney | 310/263 X |

*Primary Examiner*—Donovan F. Duggan
*Attorney, Agent, or Firm*—Karl F. Ross; Herbert Dubno

[57] ABSTRACT

The rotor core of an armature or coil-carrying rotary member of a generator comprises a stack of notched magnetically permeable plates held between a pair of flanges, one rigid with the shaft of the machine and the other held elastically thereon. Each of the flanges is provided with an annular array of angularly equispaced hollow lugs which alternate in length between long and short and extend into the notches of the stacked plates. The long lugs or bosses of one flange lie opposite the short bosses of another and the aligned bosses in the notches of the stack receive the conductors of the rotor windings.

10 Claims, 2 Drawing Figures

ROTOR FOR AN ELECTRICAL MACHINE

FIELD OF THE INVENTION

The present invention relates to a rotor for an electric machine and, more particularly, to a rotor for an electric motor or generator provided with notches receiving the windings of the rotor which can be fed with electric current or can deliver electric current through a collector and brushes, slip rings or the like. Most advantageously the invention relates to rotors for small electric motors.

BACKGROUND OF THE INVENTION

In conventional constructions of rotors of this type, the core of the rotor carrying the windings is formed by a stack of ferromagnetic sheets between a pair of flanges, the stack being fixed to the shaft of the motor. The stack is formed on its periphery with grooves into which the windings are inserted, the grooves being formed by alignment of notches in the ferromagnetic sheets.

The variation in size of a stack of the sheets must be within limited tolerances, i.e. approximately equal to the thickness of a sheet, for effective mounting of the rotor in motor by means of lock washers, snap rings or the like having the same function. These tolerances must be maintained if shifting of the rotor body is to be precluded and hence shimming is often necessary to fit the stack.

OBJECT OF THE INVENTION

It is the principal object of the present invention to provide a rotor which can be readily assembled and mounted and which is free from the axial shifting of the rotor body upon the shaft and does not require careful adjustments to avoid large tolerances.

SUMMARY OF THE INVENTION

This object is attained, in accordance with the present invention, by providing a rotor for an electric machine in which the stack of sheets is received between two flanges, one rigid with the shaft of the machine and the other fitted elastically and tightly on this shaft, each of the flanges being provided with a plurality of axially extending hollow lugs, deposited in annular arrays around the axis of the shaft and alternately of greater of lesser length, the lugs or tubular bodies being parallel to the axis of the shaft and being received within the notches of the plates such that each long body reaches toward and substantially meets a short body of the other body. Each pair of bosses form a respective notch and their central cavities are aligned and disposed so as to extend through the stack to receive the conductors of the windings of the rotor.

The two bodies and their respective axial bosses thus fulfill all of the essential functions for mounting the rotor body on the shaft.

For example, they prevent rotation of the sheets or the stack of sheets about the axis of the shaft, lock the sheets one against the other and support them against both axial and angular play, and provide a lining for the notches of the sheet stack to accommodate the windings. The bodies may be axially slit in correspondence with the openings of the notches in the sheets at the peripheries of the latter. When the flanges are composed of electrically insulating material, such as a synthetic resin, they also serve to electrically insulate the stack of ferromagnetic sheets from the collector and from the housing of the motor. Because of the fact that the bodies can be molded unitarily with the flanges from electrically insulating material, moreover, they provide an insulating sheath around the windings and between each winding and the sheet stack.

Because one of the flanges is fixed to the shaft and the other is frictinally force fitted onto the latter, the force fitted flange can be pressed tightly against the stack and can hold it against the fixed flange, thereby automatically accommodating any variations in the axial length of the stack. Thus all axial play of the stack on the shaft can be eliminated and problems which have been encountered with a pair of locking rings disposed at a fixed distance apart along a shaft, for retaining a stack of sheets when the length of the stack does not precisely correspond to this distance, are avoided.

It is not necessary, therefore, to shim, wedge or otherwise take up the axial play of the stack by techniques which have earlier been deemed common practice in this art, when the system of the present invention is used.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
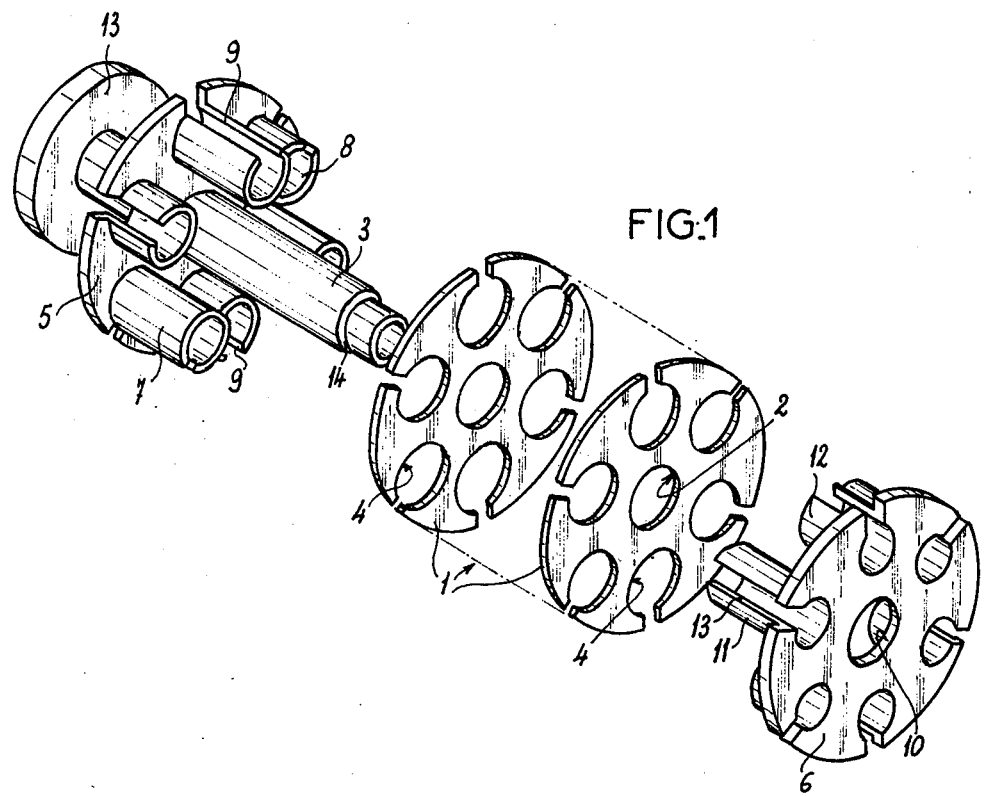
FIG. 1 is an exploded view illustrating parts of a rotor according to the invention.

The rotor shown in the drawing has been illustrated without the coils, windings or collector with which it is normally provided and thus can be considered simply a combination of armature core and shaft. The windings and collector have been omitted to more clearly illustrate structure which would be obscured by them. The rotor core is provided with six notches each of which receives a turn of the respective windings.

Figure 2:
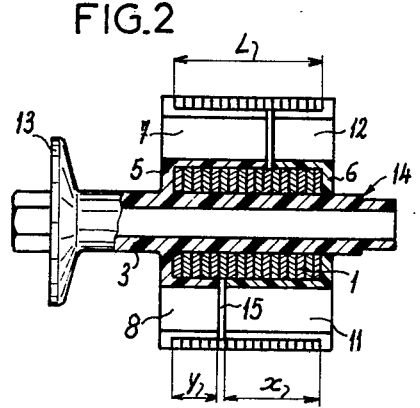
FIG. 2 is an axial section therethrough.

The rotor illustrated in FIGS. 1 and 2 is constituted in the usual manner for a magnetic circuit or armature from a stack of ferromagnetic sheets 1, only the two end sheets of the stack being represented in FIG. 1 although the entire stack is shown in FIG. 2. Each sheet 1 is provided with a central circular opening 2 through which the shaft 3 then passes and six peripheral notches 4 angularly equispaced around the axis of the stack. Each of the notches has a circular configuration and opens at the periphery of the sheet via a radial slot.

The stack of sheets 1 is locked between two flanges 5 and 6 of the same general configuration as the sheets, i.e. a circular configuration formed with six notches. The flange 5 is molded unitarily and monolitically with the shaft 3 in a single piece from a synthetic-resin material, e.g. a thermoplastic or thermosetting synthetic resin which may be reinforced with glass fiber if desired. The flange 6 which is force fitted on the shaft 3 and frictionally engages the latter, is also molded in one piece from a corresponding synthetic-resin material.

The fact of the flange 5 turned toward the stack of sheets 1 is provided with six salient portions which can be termd "lugs" and are effectively circular-cross section bodies having along their outer sides (with respect to the periphery of the flange) an axial slot 9 which coincides with the radial slot of the flange. The bosses are alternately of greater or lesser length around the periphery of the flange. The long bosses are designated at 7 and the short bosses at 8. The bosses are all, as noted, hollow or tubular.

The second flange 6 has a central opening 10 whose diameter is slightly less than that of the shaft 3 to enable this flange to be fore citted on the shaft. The face of flange 6 turned toward the stack of sheets 1 also carries alternately long and short bosses 11 and 12, respectively provided as described with a hollow interior and an outwardly turned slot 13.

The long bosses 7 and 11 are of the same length $x$ and the small bosses 8 and 12 are all of the same length $y$ (see FIG. 2).

At one end of the shaft 3 there is provided an enlargement 13, e.g. a disk-shaped flange, constituting the support for the collector while the other end is formed with a shoulder 14 and a stub portion whereby the rotor can be journaled on the motor housing. The collector itself is advantageously constituted by a disk (not shown) mounted against the enlargement 13 and in which the conductive blades and the intervening insulating blades are formed by a printed circuit as described in French printed Application No. 2,218,666.

In order to assemble the rotor, the ferromagnetic sheets 1 are first collated such that their notches 4 are aligned as accurately as possible.

The bosses of flange 5 and the shaft 3 are then inserted into the stack so that the shaft passes through central holes 2 while the bosses 7 and 8 are received snugly in the notches 4. The flange 6 is then fitted with its central hole 10 over the shaft 3 and its bosses 11 and 12 in alignment with the notches 4 of the stack. The flanges 5 and 6 are angularly positioned relative to one another such that each of the long bosses 7 or 11 is aligned with and extends toward one of the short bosses 8 or 12 of the other flange. The flange 6 is then pressed onto the shaft 3 and the stack of sheets 1 is thereby clamped between this flange and the fixed flange 5. The elasticity of the flange 6 locks are assembly in place. Advantageously, the sum of the length $x + y$ is less than the axial length L of the stack. The slots 9 and 13 open to the exterior through the radial slots of the notches 4.

Thus in the final assembled position, the end of each long boss 7 or 11 can be spaced from the aligned short boss 8 or 12 by a gap 15 whose width is equal to $L - (x+y)$. Advantageously, the gap width is less than the thickness of one of the ferromagnetic sheets 1 so that every sheet is in engagement with all of the long bosses of one flange and all of the short bosses of the other flange, thereby contributing to the rigidity of the assembly. Such as arrangement is not however imperative since the alternation of the long and short flanges will nevertheless permit the sheets to be held firmly in the stack.

After assembling of the rotor, the windings are inserted through the aforementioned slots and connected to the collector in accordance with the conventional techniques, the windings being received in the channels formed by each pair of bosses 7, 12 or 8, 11, one member of each pair prolonging the other. The shaft 3 is then fixed rotatably in the stator housing and its shoulder 14 insures precise axial positioning of the stack without the need for shimming or other correction.

The invention is particularly applicable to small electrical motors such as may be used as accessory equipment in automotive vehicles and upon which considerable research has been expended to developed a simple and economical fabrication technique.

Of course the invention is not limited to the single embodiment described above and it therefore embraces all variations within the inventive concept.

I claim:
1. A rotor for an electrical machine comprising:
   a shaft;
   a first flange fixed to said shaft and formed with a plurality of angularly equispaced notches opening toward the periphery of said first flange;
   a stack of ferromagnetic sheets on said shaft resting with one side against said first flange and having notches aligned with the notches of said first flange; and
   a second flange elastically locked to said shaft and engaging the opposite side of said stack while being formed with a plurality of notches aligned with the notches of said stack, said flanges being formed on their faces turned toward said stack with axially extending alternately long and short hollow lugs received in the notches of said stack, the long hollow lugs of one of said flanges being aligned with the short hollow lugs of the other of said flanges.
2. The rotor defined in claim 1 wherein each of said long hollow lugs of said one of said flanges by a gap having a width less than the thickness of one of said sheets.
3. The rotor defined in claim 2 wherein each of said notches is generally circular and is formed with a radially opening slot, said hollow lugs being formed with axially extending slots aligned with the slots of said lugs.
4. The rotor defined in claim 3 wherein said sheets have circular central openings traversed by said shaft.
5. The rotor defined in claim 4 wherein said second flange has a circular central opening elastically receiving said shaft, said second flange being force fitted on said shaft.
6. The rotor defined in claim 5, further comprising means for supporting a collector formed on said shaft.
7. The rotor defined in claim 6 wherein said lugs are of generally circular cross section
8. The rotor defined in claim 7 wherein each of said flanges and its respective lugs is formed unitarily from a synthetic-resin material.
9. The rotor defined in claim 8 wherein said first flange is formed unitarily with said shaft from said synthetic-resin material.
10. The rotor defined in claim 9 wherein said flanges and said sheets are circular and have the same outer diameter.

* * * * *